United States Patent [19]

Unsworth

[11] Patent Number: 4,833,386

[45] Date of Patent: May 23, 1989

[54] APPARATUS AND METHOD FOR BRAKING AN ELECTRIC MOTOR

[75] Inventor: Peter J. Unsworth, Lewes, England

[73] Assignee: Allen-Bradley Company, Inc., Milwaukee, Wis.

[21] Appl. No.: 103,729

[22] Filed: Oct. 2, 1987

[51] Int. Cl.⁴ .............................................. H02P 3/18
[52] U.S. Cl. .................................... 318/763; 318/729; 318/757
[58] Field of Search ................................ 318/757–762, 318/331, 368, 763, 764

[56] References Cited

U.S. PATENT DOCUMENTS

| 3,376,485 | 4/1886 | Shibata et al. | 318/762 |
|---|---|---|---|
| 3,569,809 | 3/1971 | Comer | 318/350 |
| 3,649,894 | 3/1972 | Yoneya . | |
| 3,652,924 | 3/1972 | Dieterich et al. | 318/807 |
| 3,708,734 | 1/1973 | Rowe . | |
| 3,795,850 | 3/1974 | Grygera | 318/331 |
| 4,151,453 | 4/1979 | Suzuki et al. | 318/762 |
| 4,227,129 | 10/1980 | Brooks | 318/331 |
| 4,230,979 | 10/1980 | Espelage et al. | 318/721 |
| 4,238,717 | 12/1980 | Knight et al. | 318/703 |
| 4,374,352 | 2/1983 | Webster | 318/762 |
| 4,392,098 | 7/1983 | Min | 318/758 |
| 4,482,853 | 11/1984 | Bhavsar | 318/778 |
| 4,556,836 | 12/1985 | Antognini | 318/696 |
| 4,607,205 | 8/1986 | Kito et al. | 318/778 |
| 4,612,490 | 9/1986 | Kagi | 318/761 |

OTHER PUBLICATIONS

Smart Motor Controller (SMC)(Bulletin 150).

Primary Examiner—David Smith, Jr.
Attorney, Agent, or Firm—Quarles & Brady

[57] ABSTRACT

An electric motor is coupled to the power lines by thyristors. The motor is braked by triggering the thyristors at the proper times to produce a electro-magnetic field within the motor which opposes the residual magnetic field of the rotor. The proper time to trigger the thyristors is determined by comparing the polarity of the voltage across the power lines to the back emf voltage from the motor. The thyristors are triggered when these two voltages have opposite polarities. The braking circuit also regulates the duty cycle of the thyristors to control the magnitude of the current applied to brake the motor.

21 Claims, 3 Drawing Sheets

APPARATUS AND METHOD FOR BRAKING AN ELECTRIC MOTOR

The present invention relates to the braking of alternating current electric motors and more particularly to circuits which apply electric power to the motor in a manner which slows it down.

BACKGROUND OF THE INVENTION

When an electric motor is started, the electric current drawn by the motor can be six times the steady state current once it reaches full speed. Manufacturing equipment and assembly lines often have a number of relatively large three-phase electric motors which start simultaneously thereby placing very large current demands on the electrical distribution system feeding the equipment or assembly line.

In order to reduce this start-up current consumption, large alternating current electric motors are often operated by a controller, as is schematically shown in FIG. 1. The motor controller 10, such as an Allen-Bradley Company model SMC-150, controls the application of electric current to the motor 12 by means of a thyristor switch module 14. The switch module includes three pairs of silicon controlled rectifiers (SCR's) 16, 17, 18, each of which couples one of the three alternating current (A.C.) supply lines A, B, or C to one of the motor stator windings 21, 22, 23. The SCR's in each pair are inverse parallel connected to provide a bidirectional electrical switch. Three trigger outputs from the motor controller are coupled by separate isolation transformers 20 to one of the SCR pairs 16, 17 or 18. The trigger output is coupled to the transformer primary coil and the gate of each SCR is connected to a separate one of two secondary coils to provide isolation. Alternatively, a single triac could be used in place of each SCR pair.

When the motor 12 is to be started, the equipment operator applies a starting signal to the motor controller 10. As is well-known, the motor controller 10 gradually increases the amount of current applied to the motor by regulating the duty cycles of the SCR's. In doing so, the controller turns on the SCR's initially for only a brief portion of each half-cycle of the A.C. voltage for the corresponding electricity phase. The controller then gradually increases the half-cycle on time of the SCR's until they are constantly turned on at which time the motor is at substantially full speed. This technique reduces the current consumption and torque of the motor during start-up as compared to a hard switching of the full supply line voltage across the motor.

These motor controllers often did not provide a mechanism for braking the motor when it was stopped. In response to an operator input to stop the motor, the basic controller simply turns off the SCR's allowing the motor to coast to a stop, slowed only by friction. If the motor is coupled to a mechanical load with considerable inertia, the motor and the load will continue to move for some time after the power is shut off. In many industrial applications of motors, it is important for convenience and efficient use of the driven equipment to stop this continued movement as fast as possible. Merely allowing the motor to coast to a stop is unsatisfactory. Heretofore, a mechanical brake was often coupled to the equipment and engaged when the power was turned off.

As an alternative, a direct current was sometimes applied to the stator windings of an alternating current motor to provide a braking action. In order to electrically brake an alternating current motor, it is necessary to generate a torque in the direction opposite to the direction of the rotation of the rotor. In the direct current injection method of the prior art, the torque is produced by the rotor attempting to rotate in the presence of a steady magnetic field produced by the direct current applied to the stator winding. The rotating direction of the rotor's magnetization leads the direction of the magnetic field produced by the direct current through stator winding. The tendency of the rotor magnetization to align itself with the stator's magnetic field creates an alignment torque which produces a braking effect on the rotor. As is well-known, this torque is equal to the product of the stator magnetic field strength and the rotor magnetization together with the sine of the angle between the two.

Another method of braking involves reversing the A.C. phases applied to the motor. This latter technique requires a mechanism to detect when the motor stops and then to shut off the electric current so that the motor does not begin running in the reverse direction.

SUMMARY OF THE INVENTION

An alternating current electric motor is stopped by disconnecting the electric current to the motor and sensing the back emf voltage produced by the gradually decaying magnetism in the rotor. In response to the sensed back emf voltage, the electric current is periodically reapplied to the motor in a manner which produces a torque that retards the movement of the motor.

After electric current to motor is disconnected, the rotor magnetization starts to decay over a period of time on the order of a second or two. During this period the rotor and its associated magnetization, rotate with respect to the stator. A braking effect can be produced if electric current pulses are passed through the stator windings at times when the direction of the rotor magnetization is leading the direction of the magnetic field which will be produced by the stator current. The alignment torque produced by the application of the current is then in a direction opposite to the rotor's rotation thereby exerting a braking torque.

Observation of the back emf voltage induced in the stator windings in the absence of a stator current gives the direction of the rotating magnetization of the rotor. This back emf voltage varies sinusoidally in time and passes through zero at the instants when the magnetization is aligned with the axis of the corresponding winding. Therefore, the instant to apply current pulses to the stator winding to produce a braking torque can be determined from the back emf voltage waveform across the stator windings. This determination gives the orientation of the rotor magnetization and hence the angle between that magnetization and the direction of the stator's magnetic field.

When the present invention is applied to a three-phase motor, the back emf voltage is sensed across one stator winding of the motor. When the sensed back emf voltage and the voltage of the phase of electricity for the other motor windings are of opposite polarity, the electricity is applied to at least one of the stator windings. In the preferred embodiment, the time that it takes the motor to stop may be varied by regulating the length of the current pulses that are applied to the stator windings.

A general object of the present invention is to provide a method of electrically braking an electric motor.

An object is to switch the electricity applied to the motor at times which optimize the braking of the motor's movement.

Another object of the present invention to accomplish the electrical braking using the switching elements that are provided in the motor starting control.

Yet another object is to regulate the magnitude of the current applied to brake the motor. This regulation permits the braking time of the motor to be adjusted and compensates for different motor loads.

A further object is to control the braking by timing the application of the braking current to zero crossings of the alternating electric line voltage.

DETAILED DESCRIPTION OF THE PRESENT INVENTION

Figure 2:
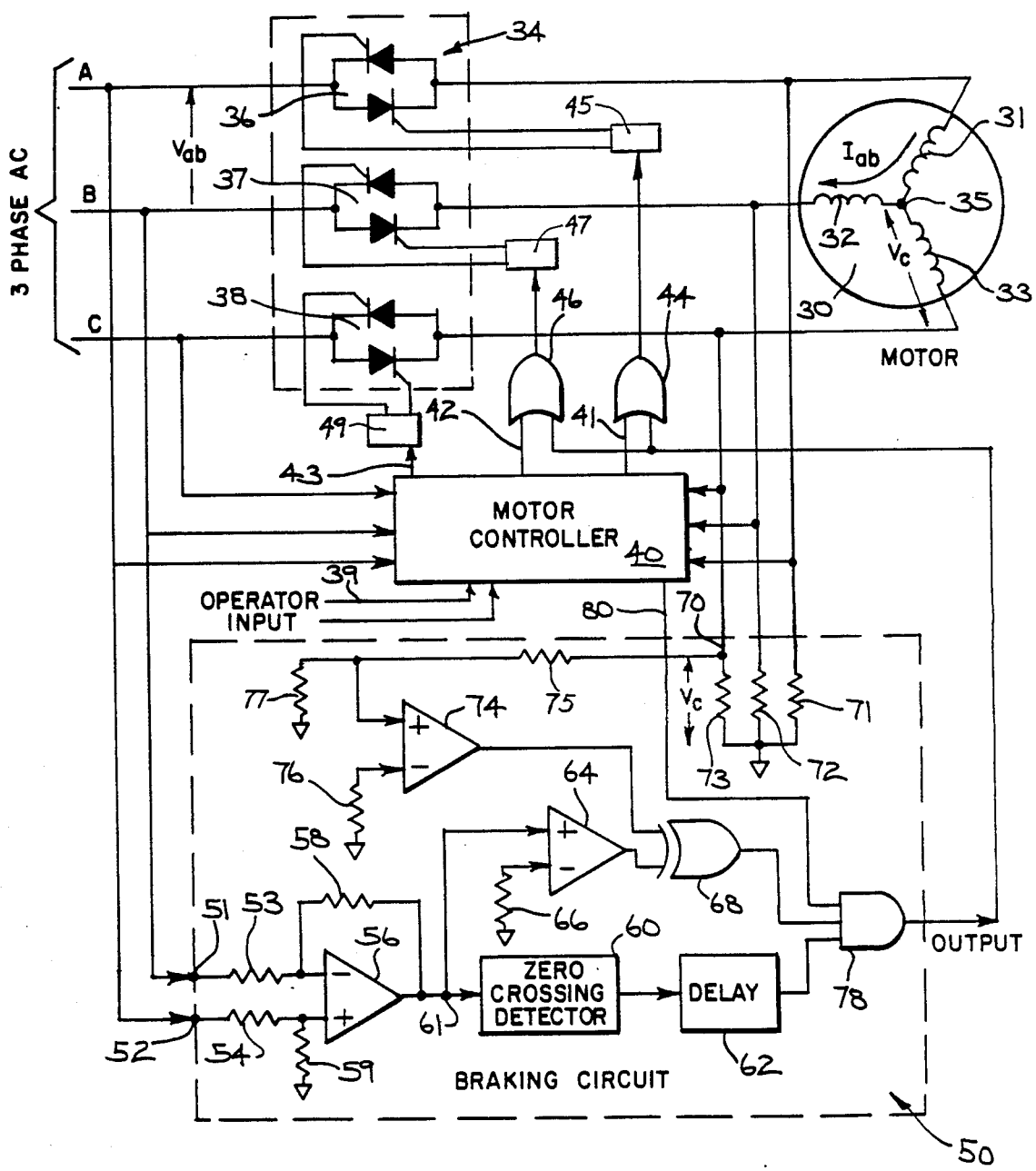
FIG. 2 is a motor starting circuit that has been modified to incorporate a braking control according to the present invention.

With initial reference to FIG. 2, a three-phase motor 30 has three stator windings 31–33. The stator windings 31–33 are connected to a source of three-phase alternating electricity by a thyristor switching module 34 and three supply lines designated A, B and C. The switch module 34 has three pairs of SCR's 36, 37 and 38. The two SCR's in each pair are inverse parallel connected and couple one of the supply lines A, B or C to one of the three stator windings 31, 32 or 33, respectively.

A conventional motor controller 40, such as an Allen-Bradley Company model SMC-150, has three inputs connected to the electric supply lines A, B and C and three motor terminal inputs connected to the windings 31–33 of the motor 30. These inputs allow the motor controller 40 to sense the instantaneous voltage across each combination of two electric supply lines and produce properly timed thyristor trigger signals at outputs 41, 42 and 43 during the starting of the motor. The first trigger signal output 41 is coupled to one input of a first OR gate 44 whose output is connected via a first isolation transformer 45 to the gate electrodes of the first pair of SCR's 36 that couple supply line A to the first stator winding 31. The second trigger signal output 42 is connected to an input of a second OR gate 46. The output of the second OR gate 46 is connected via a second isolation transformer 47 to the gate electrodes of the second pair of SCR's 37 which couple supply line B to the second stator winding 32. The third trigger signal output 43 is coupled by a third isolation transformer 49 to the gate electrodes of the pair of SCR's 38 which couple supply line C to the third stator winding 33.

A braking circuit 50 is also coupled to the motor circuit. The braking circuit 50 has two input terminals 51 and 52 which are connected to supply lines B and A, respectively. A pair of resistors 53 and 54 couple the two input terminals 51 and 52 to different inputs of a first differential amplifier 56. A feedback resistor 58 is connected between the output of the first differential amplifier 56 and its inverting input. Another resistor 59 couples the non-inverting input of the first differential amplifier 56 to ground. The first differential amplifier 56 and its associated resistors serve to reduce the voltage (Vab) between supply lines A and B to a level which is compatible with the remaining components of the braking circuit 50.

The output of the first differential amplifier 56 is connected to a zero crossing detector 60 which generates a pulse every time the alternating line voltage Vab across the supply lines A and B goes through zero volts. The output signal of the zero crossing detector 60 is fed to a variable delay circuit 62 which transmits the pulses from the zero crossing detector after a given delay period. As will be described subsequently, the delay period determines how quickly the motor is stopped.

The output of the first differential amplifier 56 representing the supply line voltage Vab is also coupled to the non-inverting input of a second differential amplifier 64. The inverting input of the second differential amplifier 64 is coupled by resistor 66 to the circuit ground. The second differential amplifier 64 produces a high or low logic level output depending upon whether supply line voltage Vab is positive or negative, respectively. This output level is connected to one input of an exclusive OR gate 68.

The terminals of each of the three motor windings 31–33 are coupled to separate equal value resistors 71–73 in a Y connection with the neutral node of the Y connected to the ground of the braking circuit. The voltage across each of the resistors 71, 72, and 73 equals the voltage across the three stator windings 31, 32 and 33, respectively. The lead 70 from the third winding 33 is coupled by resistor 75 to the non-inverting input of a third differential amplifier 74. The non-inverting input of the third differential amplifier 74 is also coupled to ground by resistor 77. This connection applies a voltage that is proportional to the voltage Vc across the third resistor 73, and hence the third stator winding 33, to the third differential amplifier 74. The inverting input of the third differential amplifier 74 is coupled by resistor 76 to the circuit ground. The third differential amplifier 74 produces a high or low logic level output depending upon whether the instantaneous voltage Vc across the third stator winding 33 is positive or negative. The output from the third differential amplifier 74 is connected to the other input of the exclusive OR gate 68.

The output of the exclusive OR gate 68 and the delay circuit 62 are connected to separate inputs of an AND gate 78. A third input of AND gate 78 is coupled to the motor controller 40 via line 80 and receives a high logic level when the motor is turned off. If this high level off signal is not available from the motor controller 40, it can be derived from the operator input line 39 to the motor controller 40 that shuts off the motor 30. The output of the AND gate 78 is connected to the other inputs of the OR gates 44 and 46 for the SCR gate electrodes.

The circuitry in FIG. 2 is used to both start and stop the motor 30. During the starting of the motor, the motor controller 40 operates as in previous systems providing phase control of the voltage applied to the motor 30. The trigger signals from the controller outputs 41 and 42 are passed by the OR gates 44 and 46 to the respective pairs of SCR's 36 and 37 to provide this conventional starting.

When the motor 30 is to be stopped, a signal is sent to the motor controller 40 via the operator input lines 39. In response to the stop signal, the motor controller 40 ceases sending trigger pulses to the pairs of SCR's 36, 37 and 38 which thereby disconnects the motor from the electric supply lines A, B and C. Even though the electric current has been disconnected, the rotor of the motor 30 has some decaying magnetism. As the rotor continues to spin, this magnetism produces a rotating magnetic field within the motor 30 which induces an alternating voltage across each of the stator windings 31-33 as shown for the third winding 33 by waveform (a) of FIG. 3. This voltage is commonly referred to as the back electro-motive force (emf) voltage. The frequency of the back emf voltage is a function of the speed of the motor 30. When the back emf voltage across a winding crosses through zero, the magnetic field from the rotor is aligned with that winding.

At the same time that the motor controller 40 ceases generating the SCR trigger signals, it also sends a high logic level braking enable signal via line 80 to the AND gate 78 in the braking circuit 50. A high level braking enable signal permits the braking signals generated by circuit 50 to control the operation of the SCR's to slow the speed of motor 30. Prior to the application of a high level braking enable signal the output from the braking circuit 50 was held at a low level which had no affect on the SCR's 36-38.

In developing the SCR signals, the braking circuit 50 senses and compares the instantaneous polarity of the supply line voltage (Vab) across lines A and B and the back emf voltage Vc across the third stator winding 33. When these voltages are of opposite polarity, the magnetic field from the rotor is oriented relative to the magnetic field generated by applying current Iab from supply lines A and B to the motor 30, such that a properly timed application of the electric current will decelerate the rotor.

Figure 3:
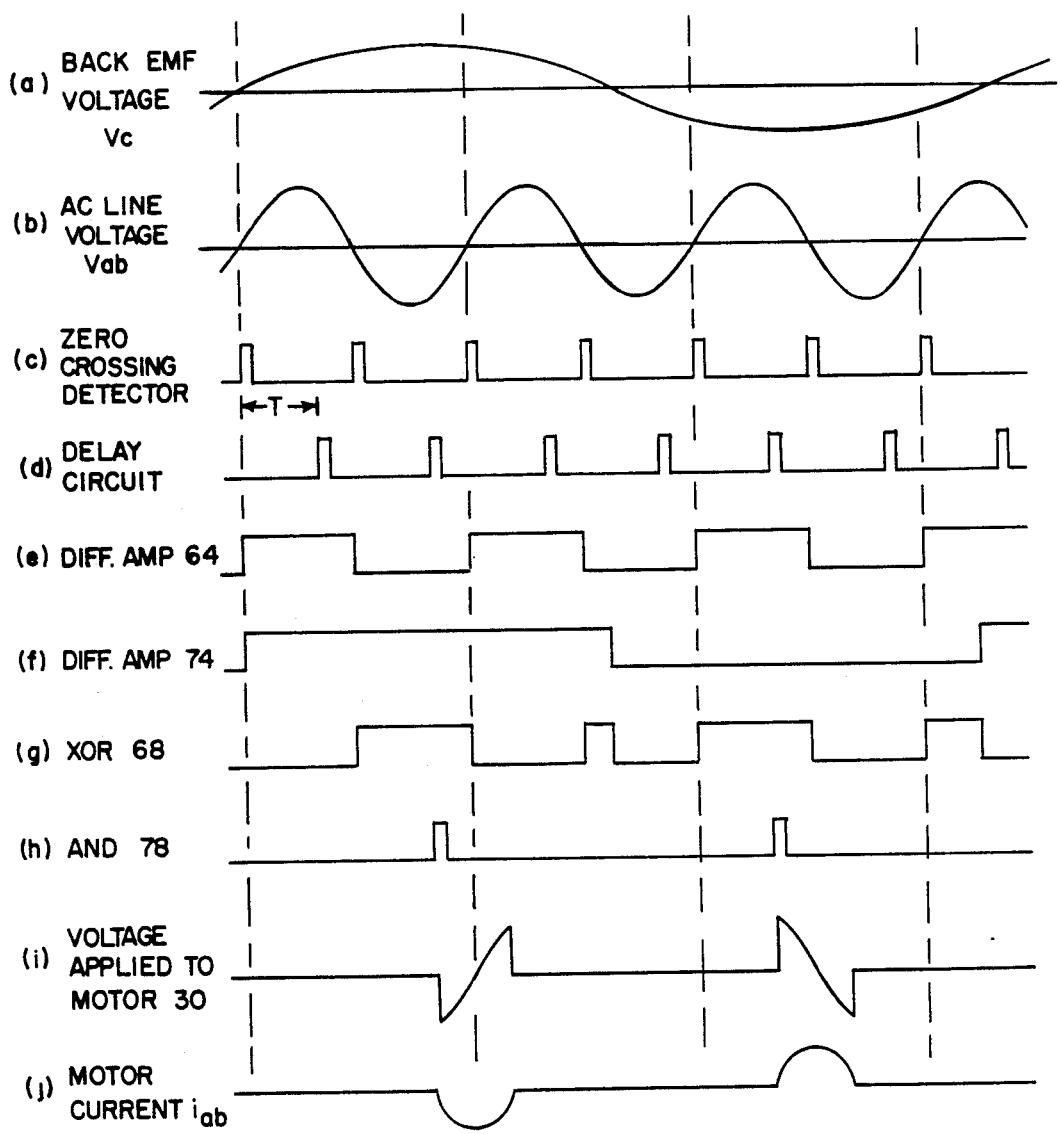
FIG. 3 illustrates the signal waveforms at different points of the FIG. 2 circuit.

The alternating voltage Vab between the A and B power supply lines is illustrated by waveform (b) in FIG. 3. The first differential amplifier 56 and its associated resistors generate a lower voltage version of this supply line voltage Vab at node 61. The zero crossing detector 60 produces an output pulse every time the line voltage Vab crosses the zero axis as shown in waveform (c) of FIG. 3. The output pulses are delayed an interval T by the variable delay circuit 62 as shown in waveform (d) and the delayed pulse signal is applied to AND gate 78.

The voltage at node 61 also is applied to the first differential amplifier 64 which produces a digital output indicative of the polarity of the supply line voltage Vab. The output of the second differential amplifier 64 is represented by waveform (e) in FIG. 5. This output has a high logic level when the supply line voltage Vab, illustrated by waveform (b), is positive and has a low logic level when the line voltage Vab is negative. This digital indication of the supply line voltage polarity is coupled to an input of exclusive OR gate 68.

The back emf voltage Vc is represented by waveform (a) in FIG. 3. The frequency of the back emf voltage is directly proportional to the motor's speed. When the electricity to a running motor is initially disconnected, the back emf voltage frequency will be close to the supply frequency (e.g. 60 Hz). As the motor slows down due initially to friction, the frequency of the back emf voltage decreases and its phase relationship to the supply line voltage Vab signal varies. The back emf voltage is sensed across resistor 73 and applied to the third differential amplifier 74 which provides a digital indication of the instantaneous polarity of the back emf induced voltage. As shown in waveform (f), the output of the third differential amplifier has a high logic level when the back emf voltage is positive and has a low logic level when this voltage is negative.

The exclusive OR gate 68 produces an output that represents the polarity relationship between the back emf voltage Vc and the supply line voltage Vab. The exclusive OR gate produces a high logic level output whenever these voltages are of opposite polarity and a low logic level whenever the voltages have the same polarity, as illustrated by waveform (g) of FIG. 3. As noted above, a braking magnetic force can be created in the motor by applying the supply line voltage to the stator windings when these polarities are opposed. Therefore, the output of the exclusive OR gate indicates when the first and second pairs of SCR's 36 and 37 can be triggered to produce a braking effect.

AND gate 76 combines the outputs of the exclusive OR gate 68 and the delay circuit 62 with the braking enable signal from the motor controller 40. Therefore, an SCR trigger pulse is generated by the braking circuit AND gate 76 only when the circuit is enabled and the delayed zero crossing pulse (waveform d) occurs when the polarities of the back emf and supply line voltages (waveforms e and f) are opposed. This braking circuit SCR trigger signal is illustrated by waveform (h) in FIG. 3.

The SCR trigger signal from the braking circuit 50 is coupled via OR gates 44 and 46 and the transformers 45 and 47 to the first and second pairs of SCR's 36 and 37 turning on the forward biased SCR of each pair. The third pair of SCR's 38 is not triggered by the braking circuit 50. The waveform of the voltage applied to the first and second stator windings 31 and 32 by triggering the first and second pairs of SCR's 36 and 37 is shown in waveform (i). The current pulses of Iab flowing through the two stator windings 31 and 32 is shown by waveform (j). The voltage is applied to the motor 30 for a slight interval beyond its zero crossing as the pulsed SCR's do not turn off until the lagging alternating current through them reaches zero. The timing of the application of the supply line voltage Vab to the motor is such that it creates an electromagnetic field that interacts with the decaying magnetic field from the rotor to slow the rotation of the rotor.

Alternatively, if the neutral line from the electric supply and the neutral motor connection 35 are available, the braking current could be applied through only one of the windings 31 or 32. In this embodiment the zero crossings and polarity of the voltage of one phase of the A.C. supply would be sensed by the braking circuit 50, rather than the voltage across two of the supply lines.

The interval T that the zero crossing pulses are delayed by delay circuit 62 can be adjusted to vary the time that it takes to stop the motor. This adjustment is made when the braking circuit is connected to the motor and is done in response to the magnitude of the load driven by the motor as well as the time within which the motor must stop. By shortening the delay interval T slightly, the pulses in waveform (d) will occur sooner in time, thereby increasing the interval during which the SCR's are turned on. This increases the length of the current pulses applied to brake the motor, thereby increasing the generated electromagnetic field and the braking torque.

Figure 1:
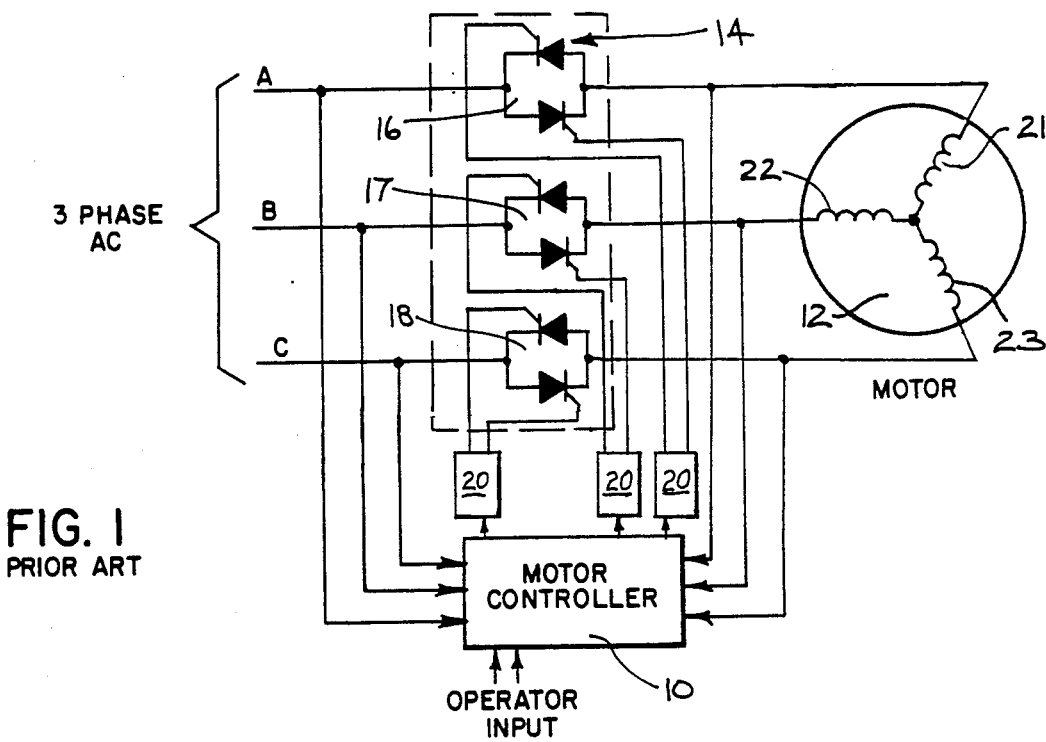
FIG. 1 is a schematic diagram of a prior art circuit for controlling the starting of a three-phase electric motor.
Figure 4:
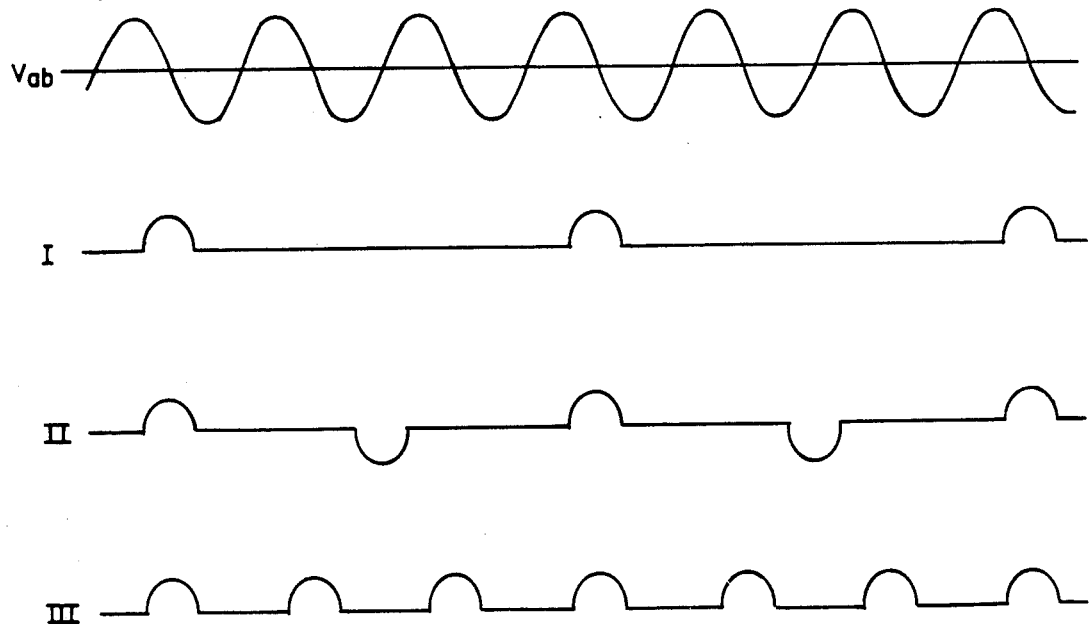
FIG. 4 is a conceptual illustration of the waveforms of the voltage of one phase of the A.C. power and the current applied to brake the motor at three speeds as the motor slows down.

As the motor slows down, the phase relationship between the back emf voltage Vc and the supply line voltage Vab changes. As a result, the SCR's are triggered more and more frequently thereby increasing the braking force. This is conceptually illustrated in FIG. 4. It should be understood that the number of cycles of the supply line voltage Vab between the SCR triggering is significantly greater than that illustrated. Waveforms I, II and III of FIG. 4 represent the current Iab that flows through the first and second stator windings 31 and 32 at three progressively slower speeds during the braking. In waveform I the SCR's are triggered only during an occasional positive half-cycle of the supply line voltage Vab. As the motor slows, additional triggering occurs during negative half-cycles between the positive half-cycle triggering as shown by waveform II. Continued slowing of the motor results in the SCR's being triggered during successive positive half-cycles of the line voltage Vab as illustrated by waveform III. Additional SCR trigger patterns occur between those illustrated in FIG. 4 as well as before and after the speeds represented by waveform I and III, respectively.

As described above, the motor controller 40 may comprise an Allen-Bradley model SMC-150. This is a microprocessor based device which contains a computer program that governs its operation. Other types of microprocessor based motor controllers are commercially available. The SMC-150 has a stall detection feature which senses the back emf voltage across one stator winding at times during the motor's starting when that winding's SCR's are off. Therefore, the present invention can easily be implemented by program changes in such a microprocessor based motor controller.

A software implementation would permit further refinement of the invention. One such refinement would be to derive the velocity of the rotor from the back emf voltage signal and determine from that velocity when the rotating magnetic field of the rotor is aligned with the first two windings 31 and 32. When such alignment occurs and the supply line voltage has the proper polarity, the SCR's can be triggered to produce the optimum braking force.

Although substantial braking occurs with the system described above, the braking action can be increased by sequentially applying the current through the other pair combinations of the three stator windings 31-33. This improved system would require a modification of the circuitry shown in FIG. 2 in order to trigger the third set of SCR's 38 and to properly time the different current flows. The application of current to all stator windings can be enhanced by sensing the back emf voltage across all three stator windings so that a more precise determination of the alignment of the rotor's magnetic field with respect to each winding can be made.

What is claimed is:

1. A method for braking an electric motor comprising the steps of:
    sensing the polarity of an alternating supply voltage for powering the motor;
    sensing the polarity of the back emf voltage from the motor; and
    applying pulses of the supply voltage to the motor in response to the supply voltage and the back emf voltage being of opposite polarities to produce a magnetic field which reduces the speed of the motor.

2. The method as recited in claim 1 further comprising the step of detecting zero crossings of the supply voltage; and wherein said step of applying the supply voltage is also in response to the detected zero crossings.

3. The method as recited in claim 1 further comprising the steps of:
    detecting zero crossings of the supply voltage and producing a signal which indicates such zero crossings;
    delaying the zero crossing signal for a given interval of time; and
    wherein said step of applying the supply voltage is also in response to the delayed zero crossing signal.

4. The method as recited in claim 3 wherein the supply voltage is applied to the motor upon a delayed zero crossing indication occurring whenever the supply voltage and the back emf voltage have opposite polarities.

5. A method for braking a three-phase electric motor having three windings and a rotor, said method comprising the steps of:
    (a) sensing the polarity of the back emf voltage produced across a winding of the motor;
    (b) sensing the polarity of the alternating voltage of one phase of an electricity supply;
    (c) applying pulses of current from the electricity supply through at least one of the windings which produce a negative torque in the motor to decrease the speed of the rotor, each pulse being applied in response to the polarity of the back emf voltage having has a predetermined relationship to the polarity of the voltage of the one phase of the electricity supply.

6. The method as recited in claim 5 further comprising the step of producing a signal which indicates the occurrence of a zero crossing of the voltage of the one phase of the electricity supply; and the step of applying the current also being in response to the signal.

7. The method as recited in claim 5 further comprising the steps of:
    producing a signal which indicates the occurrence of a zero crossing of the voltage of one phase of the electricity supply; and
    delaying the signal which indicates a zero voltage crossing by a given interval;
    said step of applying the current also being in response to the delayed signal.

8. The method as in claim 7 wherein the given interval is less than one-half the period of the voltage of the one phase of the electricity supply.

9. The method as recited in claim 7 wherein the current is applied in step c) upon a delayed zero crossing indication occurring whenever the back emf voltage and the voltage of the one phase of the electricity supply have opposite polarities.

10. The method as recited in claim 5 wherein in step (c) the current is applied through the other two windings of the motor.

11. The method as recited in claim 10 further comprising the step of:
    delaying the signal which indicates a zero crossing; and
    wherein step (c) applies the current through the other two windings upon a delayed zero crossing indication occurring whenever the back emf voltage and the voltage of the one phase of the electricity supply have opposite polarities.

12. A method for braking a three-phase electric motor having three windings wherein alternating electricity for the motor is supplied by three conductors, said method comprising the steps of:

(a) sensing the polarity of the back emf voltage produced across at least one winding of the motor;

(b) sensing the polarity of the alternating voltage across two of the conductors;

(c) applying current from the electricity supply through at least one of the windings to produce a negative torque in the motor to reduce the speed of the motor, the current being applied in response to the polarity of the back emf voltage having a predetermined relationship to the polarity of the voltage across the two conductors.

13. The method as recited in claim 12 further comprising the step of producing a signal which indicates the occurrence of a zero crossing of the voltage across the two conductors; and the step of applying the current also being in response to the signal.

14. The method as recited in claim 12 further comprising the steps of:

producing a signal which indicates the occurrence of a zero crossing of the voltage across the two conductors; and delaying the signal which indicates a zero voltage crossing by a given interval;

said step of applying the current also being in response to the delayed signal.

15. The method as in claim 14 wherein the given interval is less than one-half the period of alternating voltage across the two conductors.

16. The method as recited in claim 14 wherein the current is applied in step (c) upon a delayed zero crossing indication occurring whenever the back emf voltage and the voltage across the two conductors have opposite polarities.

17. A system for braking a motor having three windings, said system comprising:

a switch means having separate switch elements for selectively coupling each of the motor windings to a source of three-phase alternating electricity;

means for sensing the polarity of the back emf voltage produced across one of the windings;

means for sensing the polarity of a voltage from the electricity source; and means, coupled to both of the means for sensing, for activating said switch means to apply electricity from the source to said motor in the form of a pulse which causes a decrease in the speed of the motor, the pulse being applied whenever the polarity of the back emf voltage has a predetermined relationship to the polarity of the voltage from the electricity source.

18. The system as recited in claim 17 wherein the pulse applied by said means for activating said switch means produces a negative torque in the motor.

19. The system as recited in claim 17 further comprising means for detecting when the electricity source voltage makes a zero crossing; and said activating means also being responsive to said detecting means.

20. The system as recited in claim 17 further comprising:

means for generating a signal indicating when the electricity source voltage makes a zero crossing; and means for delaying the zero crossing signal for a given interval;

wherein said activating means is also responsive to the delayed zero crossing signal.

21. The system as recited in claim 17 wherein said activating means includes means for activating said switch means upon the delayed zero crossing signal occurring when the back emf voltage and the electricity source voltage have opposite polarities.

* * * * *